Patented Nov. 7, 1933

1,933,716

UNITED STATES PATENT OFFICE 1,933,716

MANUFACTURE OF SYNTHETIC RESINS FROM UNSATURATED HYDROCARBONS

Roland B. Day, Chicago, Ill., assignor to Universal Oil Products Company, Chicago, Ill., a corporation of South Dakota No Drawing. Application December 18, 1931
Serial No. 581,996

6 Claims. (Cl. 260—3)

This invention relates to the manufacture of resins and refers more particularly to the manufacture of such resins by synthetic polymerization and condensation reactions among organic compounds.

More particularly the invention has reference to a process involving the simultaneous and concurrent polymerization of aldehydes and petroleum fractions containing relatively high percentages of olefinic and unsaturated cyclic hydrocarbons. The particular nature of the aldehydes and the petroleum fractions employed and the manner in which the composite resin may be produced will be disclosed fully in the following specification.

The paint and varnish industry is familiar with numerous substitutes offered for the natural gums used in paints and varnishes, such as gum copal, gum dammar, gum kauri, and various grades of shellac. The properties most essential to the use of these gums is their solubility in light volatile solvents such as turpentine, acetone and benzol, and their tendency to form a light-colored elastic film on evaporation of the solvent. The present invention is concerned with the manufacture of substitutes for these naturally-occuring gums by polymerization of relatively cheap materials to form condensation products having desired properties, as will appear more fully hereinafter.

In one specific embodiment the invention comprises the concurrent polymerization of aldehydes and oxidized petroleum distillates to form materials of a resinous nature.

Among the aldehydes which may be used may be mentioned formaldehyde, acetaldehyde, paraldehyde, acrolein, crotonaldehyde, capronaldehyde, butyraldehyde and other aldehydes of higher molecular weight of both the aliphatic and aromatic series of hydrocarbons, such as, for example, benzaldehyde, furfural and a number of mixed aliphatic-aromatic aldehydes.

The petroleum fractions which it is preferred to use for best results are the partially oxidized cracked distillates produced in the treatment of high boiling petroleum oils at elevated temperatures and pressures. It is well known that such distillates contain varying proportions of unsaturated compounds, both straight chain and cyclic, and that these classes of compounds are susceptible to polymerization and condensation reactions under the influence of oxidation, light, electrical energy, etc. Such distillates will form a certain limited amount of resinous material of inferior quality when subjected to controlled oxidation in the absence of other polymerizable substances but it has been found that more commercially utilizable gums can be obtained when such gum-forming reactions are permitted to take place in the presence of aldehydes such as those mentioned above, the result being the production of composite gummy substances with properties superior to those possible of formation from the two separate base materials.

When the distillates available for use in resin manufacture contain relatively low amounts of unsaturated and polymerizable constituents it may frequently be of advantage to segregate such constituents by treating the distillates with sulfuric acid, liquid sulfur dioxide, dimethylsulfate and other reagents capable of reacting substantially completely with or dissolving the unsaturated constituents of the distillate. When sulfuric acid is employed the sludge produced may be hydrolyzed to liberate the combined unsaturated compounds, some reappearing substantially in the same form in which they occurred in the distillate and some undergoing transformations usually in the direction of increased molecular weight and decreased unsaturation. In any event, the separated oil may be utilized directly or may be subjected to a preliminary oxidizing treatment, such as, for example, treating at a slightly elevated temperature by a stream of air in the presence of selected metallic oxide mixtures.

The portion of cracked distillate extracted by liquid sulfur dioxide undergoes no material change and may be recovered by simple evaporation of the sulfur dioxide under reduced pressure and slightly elevated temperature, according to the well known operations of liquid sulfur dioxide treatments.

Another type of material especially adapted to use in the present invention are the polymers produced by passing cracked vapors over adsorbent materials such as fuller's earth, clays, bauxite, etc., these materials usually being obtained in solution in the reflux from the bottom of treating towers containing adsorbent material, and recoverable by evaporation of the excess of unchanged oil in which they are dissolved. In some cases these materials may be used in resin-forming condensation reactions with aldehydes without preliminary oxidation since the polymerization reactions have been already brought out in part by the clay or other adsorbent material.

As an example of operation for the production of a soluble, fusible resin from an aldehyde and a cracked distillate, the following case may be cited: The sulfur dioxide extracted material from a cracked gasoline containing approximately 20 percent of unsaturates may be boiled for one hour with refluxing with an aqueous solution of 40 percent formaldehyde. At the end of this heating period a two-layer system is observed, the upper consisting mostly of an oily layer and the bottom consisting of an aqueous layer in which resinous material is emulsified and from which resin is obtained by evaporation of the water. The resin thus obtained may be light brown and transparent, soluble in acetone and alcohol and utilizable in all respects as a shellac substitute.

The process may be varied according to the particular type of aldehyde used, the nature of the oxidized cracked oil and the particular products desired in the finished resin. In a majority of cases boiling under reflux conditions may be sufficient but in others it may be better economy to use superatmospheric pressures in the digestion in order to obtain higher temperatures, increase the capacity of apparatus, and minimize losses. Catalytic materials may be used to accelerate the reactions, such as minor amounts of sulphuric acid, hydrochloric acid, sodium hydroxide, ammonia, zinc chloride, etc.

While it is generally preferable to use the more readily oxidizable constituents of natural or synthetic petroleums, it is also within the scope of the invention to oxidize the more saturated portions, such as substantially saturated distillates of limited boiling point range, such oxidations tending to remove hydrogen and induce polymerization reactions of the same general type occurring naturally in straight chain or cyclic hydrocarbons containing double bonds.

What I claim as my invention is:

1. A process for the production of synthetic resins which comprises subjecting hydrocarbon distillates containing a substantial amount of unsaturated hydrocarbons to the action of a solvent to separate the unsaturated hydrocarbons from the relatively saturated hydrocarbons removing the solvent therefrom and thereafter reacting the separated relatively unsaturated hydrocarbons with an aldehyde.

2. A process for the production of synthetic resins having electrical insulating and non-corrosive properties which comprises separating the relatively unsaturated hydrocarbon components of cracked distillates by means of a solvent, separating the solvent therefrom and reacting the thus separated unsaturated hydrocarbons with an aldehyde.

3. A process for the production of synthetic resins which comprises subjecting hydrocarbon distillates containing a substantial amount of unsaturated hydrocarbons to the action of a liquid sulphur dioxide to separate the unsaturated hydrocarbons from the relatively saturated hydrocarbons, removing the liquid sulphur dioxide therefrom and thereafter causing the separated relatively unsaturated hydrocarbons to be reacted on by an aldehyde in the presence of sulphuric acid.

4. A process for the production of synthetic resins having electrical insulating and non-corrosive properties which comprises separating the relatively unsaturated hydrocarbon components of cracked distillates by means of a liquid sulphur dioxide, removing the liquid sulphur dioxide therefrom and subjecting the liquid sulphur dioxide free unsaturated hydrocarbons to reaction with an aldehyde in the presence of an alkali.

5. The process for the production of synthetic resins which comprises subjecting cracked hydrocarbon oils to reaction with an oxidizing gas to cause the formation of oxidation products therein, subjecting the oxidized hydrocarbon mixture to the action of a solvent to separate the relatively unsaturated components therefrom separating the solvent from the dissolved hydrocarbons and causing the latter to react with an aldehyde.

6. The process for the production of synthetic resins which comprises subjecting cracked hydrocarbon oils to reaction with an oxidizing gas to cause the formation of oxidation products therein, subjecting the oxidized hydrocarbon mixture to the action of a solvent to separate the relatively unsaturated components therefrom, separating the solvent from the dissolved hydrocarbons and causing the latter to react with an aldehyde in the presence of sulphuric acid.

ROLAND B. DAY.